United States Patent [19]

Shimazaki

[11] Patent Number: 4,576,929

[45] Date of Patent: Mar. 18, 1986

[54] ACTIVE CARBON FIBERS AS ADSORBENT FOR WATER PURIFICATION

[75] Inventor: Kenji Shimazaki, Shizuoka, Japan

[73] Assignee: Toho Beslon Co., Ltd., Tokyo, Japan

[21] Appl. No.: 682,955

[22] Filed: Dec. 18, 1984

[30] Foreign Application Priority Data

Dec. 22, 1983 [JP] Japan .................................. 58-240874

[51] Int. Cl.$^4$ .............................................. B01J 20/20
[52] U.S. Cl. .................................... 502/417; 502/416; 264/29.2; 423/447.2; 423/447.4; 423/447.6; 210/483
[58] Field of Search ............... 502/416, 417; 264/29.2; 423/447.2, 447.4, 447.6

[56] References Cited

U.S. PATENT DOCUMENTS

| | | | |
|---|---|---|---|
| 4,285,831 | 8/1981 | Yoshida et al. | 502/424 |
| 4,362,646 | 12/1982 | Ikegami et al. | 502/222 X |
| 4,412,937 | 11/1983 | Ikegami et al. | 502/417 X |
| 4,460,650 | 7/1984 | Ogawa et al. | 423/447.5 X |

Primary Examiner—W. J. Shine
Attorney, Agent, or Firm—Sughrue, Mion, Zinn, Macpeak and Seas

[57] ABSTRACT

Active carbon fibers derived from acrylic fibers and having a BET specific surface area (SA) of 800 to 2,000 m$^2$/g, a pore volume (Vp) to (SA) ratio, i.e., (Vp)/(SA), of from $5 \times 10^{-4}$ to $14.5 \times 10^{-4}$, and a methylene blue adsorption rate constant of not less than $5 \times 10^{-1}$ sec$^{-1}$, and a filter adsorption unit for water purification using said active carbon fibers; the unit is useful to remove compounds having a wide range of molecular weights from an aqueous liquid.

11 Claims, 7 Drawing Figures

ACTIVE CARBON FIBERS AS ADSORBENT FOR WATER PURIFICATION

FIELD OF THE INVENTION

This invention relates to active carbon fibers and a filter adsorption unit for water purification having excellent adsorption characteristics using such active carbon fibers.

BACKGROUND OF THE INVENTION

Hitherto, active carbon such as granular carbon, powdery carbon, pulverized carbon, etc., has been widely utilized as a material for removing impurities, toxic materials, bad smells, etc., in gases or liquids. Recently, active carbon fibers (hereinafter, also referred to as ACF; ACF is also sometimes called fibrous active carbon) have been developed and used for the same purposes as active carbon. Since ACF has features in the form different from granular active carbon, etc., has a high adsorption rate and gives less formation of fine powders, the use thereof is being expanded rapidly.

ACF derived from acrylic fibers and having high adsorptive characters has been developed (see, Japanese Patent Publication No. 1803/84 and Japanese Patent Application (OPI) Nos. 71,614/'80 (the term "OPI" indicates an unexamined published patent application open to public inspection), Japanese Patent Application (OPI) No 130110/'83 (which corresponds to U.S. Pat. No. 4,460,650); and U.S. Pat. Nos. 4,256,607; 4,285,831; 4,362,646; 4,412,937, etc.). ACF have a specific surface area of about from 500 to 2,000 m$^2$/g and a ratio of a pore volume (Vp) to specific area (SA) of from $3.5 \times 10^{-4}$ to $7.5 \times 10^{-4}$, and shows a very high adsorption character for low molecular weight compounds having molecular weights lower than about 120 and compounds having a small molecular volume in the vapor-phase or the liquid-phase, in particular the vapor-phase use.

However, in the case of using for water purification, conventional ACF cannot sufficiently attain the desired purposes even if ACF derived from acrylic fiber by a conventional method are used. That is, in the case of water purification, a waste liquid to be treated sometimes contains various materials from low molecular weight compounds to high molecular weight compounds but conventional ACF have small pore diameters and hence cannot adsorb high molecular weight compounds having molecular weights of higher than about 500. That is, conventional ACF cannot inclusively remove by adsorption various compounds having a wide range of molecular weights.

SUMMARY OF THE INVENTION

Under the circumstances as described above, the present inventors have conducted extensive investigations for the purpose of developing ACF fitting the purpose of water purification and as the result thereof, it has been discovered that ACF derived from acrylic fibers and having specific physical characteristics are effective for the intended purpose and the inventors have succeeded in attaining the present invention based on the discovery.

Also, as a result of further investigations, the inventors have further discovered that when both low molecular weight compounds and high molecular weight compounds existing in a waste liquid to be treated and the low molecular weight compounds (including carcinogens and bad smell generating materials) are intended to be adsorptively removed preferentially and at high speed, the high molecular weight compounds hinder ACF from adsorbing the low molecular weight compounds.

The primary object of this invention is to provide active carbon fibers capable of adsorptively removing compounds having a wide range of molecular weights existing in an aqueous liquid to be treated and also to provide a filter adsorption unit for water purification using the active carbon fibers.

The present inventors have extensively investigated in order to solve the above-described problems and attain the above object, and have found that the object can be attained by the active carbon fibers having the specific characteristics as set forth below.

Also as result of such investigations, it has further been found that the object can be more effectively attaind by successively disposing ACF having large pores and conventional ACF having relatively small pores and passing water to be treated through these ACF successively.

That is, according to this invention, there is provided active carbon fibers derived from acrylic fibers and having a BET specific surface area (SA) of from 800 to 2,000 m$^2$/g, a pore volume (VP) to specific surface area (SA$_1$) ratio (S$_1$), e.g., (VP$_1$)/(SA$_1$) of from $5 \times 10^{-4}$ to $14.5 \times 10^{-4}$, and a methylene blue adsorption rate constant (MB$_1$) of not less than $5 \times 10^{-1}$ sec$^{-1}$ (hereinafter, the active carbon fibers are referred to as ACF(1)). The present invention further provides a filter adsorption unit for water purification comprising the above-described ACF(1).

Also, according to other embodiment of this invention, there is further provided a filter adsorption unit for water purification comprising ACF(1) and active carbon fibers having a BET specific surface area (SA$_2$) of from 800 to 2,000 m$^2$/g, the ratio (S$_2$) of a pore volume (VP$_2$) to specific surface area (SA$_2$), e.g., (VP$_2$)/(SA$_2$) of from $3.5 \times 10^{-4}$ to $8.5 \times 10^{-4}$, and a methylene blue adsorption rate constant (MB$_2$) of not less than $5 \times 10^{-1}$ sec$^{-1}$, and S$_1$/S$_2$ > 1.24 (hereinafter, the latter active carbon fibers are referred to as ACF(2)), and said ACF(1) and ACF(2) are preferably disposed successively in a water passing direction.

DETAILED DESCRIPTION OF THE INVENTION

Figure 1:
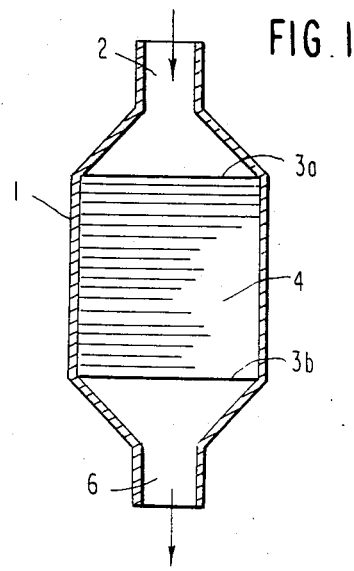
FIG. 1 is a cross-sectional view showing an example of the filter adsorption unit for water purification using ACF(1) of this invention.

ACF(1) having the above described characterstics for use in this invention can inclusively filter out an organic compounds of a wide range of molecular weights and can give an excellent water purification effect. For example, some waste solution to be treated contains low molecular weight compounds having molecular weights of lower than about 120, such as chloroform, trichloroethane, tetrachloroethylene, trichloroethylene, ethanol, acetone, etc.; intermediate molecular weight compounds having molecular weights of about 120 to 1,000, such as Geosmin, 2-methylisoborneol (an odorous component), etc.; and organic compounds having molecular weights of higher than about 1,000; the ACF(1) for use in this invention can effectively remove adsorptively all these compounds. Moreover, ACF(1) can quickly remove these compounds at a high adsorption rate.

On the other hand, as described above, it is difficult for conventional ACF to remove high molecular weight compounds present in a liquid phase; furthermore, it is also difficult for granular active carbon, etc., to perform quick removal of high molecular weight compounds owing to the low adsorption rate thereof, although such can remove these compounds, and such active carbon shows a very low adsorption rate for low molecular weight compounds having molecular weights of lower than 1,000, which makes the quick removal of these compounds impossible.

As described above, the ACF(1) for use in this invention can effectively remove at a high adsorption rate compounds having a wide range of molecular weights, mean pore diameter of active carbon, and a larger value of the ratio indicates that the pore diameter is larger.

The methylene blue adsorption rate constant of ACF is a constant determined by the following equation from the concentration of remaining methylene blue when 200 ml of an aqueous solution of 1500 ppm (ppm is all by wt/wt in this invention) of methylene blue is passed through a column of 3 cm in diameter packed with 0.5 g of ACF (the packed layer height is 0.5 cm) at a contact time $t_1$;

$$K(\sec^{-1}) = \frac{\log C_o - \log C}{t_1}$$

$C_o$: The methylene blue concentration (150 ppm) of the original solution.
$C$: The methylene blue concentration (ppm) when the original solution is treated at contact time $t_1$.
$t_1$: Contact time (sec).

The ACF(1) for water purification of this invention have specific characteristic values on the above-described three items and can be obtained by the production method as described hereinafter: conventional ACF and granular active carbon, etc., do not have such characteristic values.

The performances of various ACF are shown in Table 1.

TABLE 1

| No. | Kind of precursor for ACF | Characteristics SA ($m^2$/g) | Vp/SA | Adsorption rate const. of methylene blue ($\sec^{-1}$) | Performance Removing ratio (%) of Geosmin (a) | Removing ratio (%) of vitamin $B_{12}$ (b) |
|---|---|---|---|---|---|---|
| 1 | polyacrylonitrile | (612) | ($4.0 \times 10^{-4}$) | ($3.2 \times 10^{-3}$) | 7 | 0 |
| 2 | " | (610) | ($4.0 \times 10^{-4}$) | $600 \times 10^{-3}$ | 39 | 0 |
| 3 | " | (630) | $6.5 \times 10^{-4}$ | ($3.3 \times 10^{-3}$) | 8 | 11 |
| 4 | " | 851 | ($3.8 \times 10^{-4}$) | ($41.0 \times 10^{-3}$) | 17 | 0 |
| 5 | " | 837 | $6.9 \times 10^{-4}$ | ($100 \times 10^{-3}$) | 21 | 12 |
| 6 | " | 914 | $7.9 \times 10^{-4}$ | $790 \times 10^{-3}$ | 96 | 100 |
| 7 | " | 1505 | ($4.7 \times 10^{-4}$) | ($370 \times 10^{-3}$) | 21 | 0 |
| 8 | " | 1500 | $12.1 \times 10^{-4}$ | $4700 \times 10^{-3}$ | 100 | 100 |
| 9 | Rayon series | 1370 | ($4.7 \times 10^{-4}$) | ($390 \times 10^{-3}$) | 17 | 0 |
| 10 | " | 1140 | $7.9 \times 10^{-4}$ | ($410 \times 10^{-3}$) | 21 | 87 |
| 11 | Phenol series | 1510 | ($4.0 \times 10^{-4}$) | ($97 \times 10^{-3}$) | 24 | 0 |
| 12 | " | 1905 | ($4.2 \times 10^{-4}$) | ($480 \times 10^{-3}$) | 39 | 24 |

In above Table 1:
Molecular weight of Geosmin: 182
Molecular weight of vitamin $B_{12}$: 1350
SA: BET specific surface area ($m^2$/g)
Vp: Pore voluem (cc/g)
(a): The removal ratio of threshold odor (TO) in the case of passing 250 liters of an aqueous solution of Geosmin having TO of 500 through a column of 3 cm in diameter packed with 5 g of ACF at a height of 7 cm at SV of 50 $hr^{-1}$. (wherein, SV is a ratio of a liquid passing capacity ($V_1$) per hour to the packed ACF volumn ($V_0$), e.g., ($V_1/V_0$).
The threshold odor is measured by the Drinking Water Test Method, page 182, by Nippon Suido Kyokai. That is, 100 ml of odoriferous water is placed in one flask having a volume of 200 ml, 100 ml of odorless water is placed in each of two flasks, each having a volume of 200 ml, and an odorous flask is sought among the three flasks while diluting the odorous water with water. The diluted magnification when the discrimination of the odorous flask becomes impossible is called "threshold odor". The method is hereinafter called the "three flasks comparison type odor measurement method".
(b): The removal ratio of vitamin $B_{12}$ (by colorimetry) when 2000 ml of an aqueous solution of 100 ppm of vitamin $B_{12}$ through a column of 3 cm in diameter packed with 5 g of ACF at a height of 7 cm at SV of 50 $hr^{-1}$.
Valves in parentheses show those which are outside range of the present invention.

from low molecular weight compounds to high molecular weight compounds, in use for water purification, and hence the ACF(1) are very advantageous in industry.

The BET-specific surface area of ACF is determined by the so-called BET method (see Journal of American Chemical Society (1938) 60, p 309), based on the adsorbed amount of nitrogen gas at a liquid nitrogen temperature ($-195.8°$ C.) and a partial pressure of $N_2$ gas in a mixture gas of a $N_2$ and He gas of 0.30. The pore volume of the ACF is determined from the adsorbed amount of nitrogen gas at a liquid nitrogen temperature and a partial pressure of $N_2$ gas in a mixture of a $N_2$ and He gas of 0.95. Also, the ratio of the pore volume to the specific surface area is in a proportional relation to the In Table 1, Sample Nos. 6 and 8 meet the conditions of this invention and it can be seen that the adsorption performances of these samples were excellent.

In this invention, it is necessary that the BET specific surface area of ACF(1) is from 800 to 2,000 $m^2$/g. If the specific surface area is less than 800 $m^2$/g, the adsorptive capability of the ACF are low. Also, in this case, it is difficult to produce ACF which satisfies the required ratio of the pore volume to specific surface area and the methylene blue adsorption rate constant which are defined for this invention. On the other hand, if the BET specific surface area is over 2,000 $m^2$/g, the strength of fibers is low, which results in forming fine powders from the fibers. Therefore it makes unsuitable the use of such ACF for practical purpose. The BET specific surface area is preferably from 900 to 1,800 m²/g in this invention.

It is necessary in this invention that the pore volume ($V_{p1}$) to BET specific surface area ($SA_1$) ratio, i.e., ($V_{p1}$)/($SA_1$) is in the range of from $5 \times 10^{-4}$ to $14.5 \times 10^{-4}$. If the ratio is lower than $5 \times 10^{-4}$, the adsorbing amount for high molecular weight compounds (having molecular weights of higher than about 500) in a liquid phase is greatly reduced; on the other hand, if the ratio is higher than $14.5 \times 10^{-4}$, the adsorbing amount for low molecular weight compounds (having molecular weights of lower than 150), for example, bad smell materials such as Geosmin, etc., is greatly reduced as well as the formation of surface defects is increased to thereby reduce the strength of fibers. It is preferable that the pore volume is from 0.4 to 2.00 cc/g, and ($V_{p1}$)/($SA_1$) is in the range of from $5.5 \times 10^{-4} \sim 12.5 \times 10^{-4}$.

The methylene blue adsorption rate constant is an indicator for knowing the adsorption rate for compounds having molecular weights of from 80 to 1,400, and it is necessary in this invention that the methylene blue adsorption rate constant is higher than $5 \times 10^{-1}$ sec$^{-1}$. If the constant is lower than $5 \times 10^{-1}$ sec$^{-1}$, the adsorbing amount for compounds having molecular weights of from 80 to 1,400 tends to be greatly reduced. It is preferred in this invention that the methylene blue adsorption rate constant is higher than $6 \times 10^{-1}$ sec$^{-1}$.

Two or more kinds of ACF(1) each having different $SA_1$, $V_{p1}$ and methylene blue adsorption rate constant may be used in this invention as a combination thereof. The length of fibers is usually longer than 2.0 mm and they can be used as the form of felt, nonwoven fabric, etc., or as is.

The unit of this invention is ordinarily obtained by packing above-described ACF in a vessel having an inlet for water to be treated, a packing space for ACF, and an outlet for treated water. The ACF are usually held in the vessel by holding plates such as wire netting, etc.

An example of the unit of this invention is shown in FIG. 1. That is, FIG. 1 is a cross-sectional view showing an example of the filter adsorption unit for water purification of this invention. As shown in FIG. 1, the unit is composed of an ACF-containing vessel 1 having an inlet 2 for water to be treated and an outlet 6 for treated water packed with ACF 4 holded by holding plates 3a and 3b made of, for example, wire net. The arrow shows the passing direction of the water. ACF of this invention can be packed in the vessel in various forms as shown in FIG. 3 to FIG. 6.

The packing density of ACF is usually in the range of from 0.04 to 0.25 g/cc. If the density is lower than 0.04 g/cc, the contact of ACF and water to be treated is insufficient, whereby the capability of the filter adsorption unit is reduced. On the other hand, if the density is higher than 0.25 g/cc, the pressure loss increases extraordinarily, making the passage of water difficult. It is more preferred that the packing density is from 0.07 to 0.20 g/cc.

In this invention, it is preferred to use the above-described ACF, i.e., ACF(1) together with ACF(2). If ($MB_2$) is outside the above-described range the adsorbing capability of removing coumpounds having a wide range of molecular wights reduces. The preferable range of ($SA_2$) is from 900 to 1,800, the preferable range of ($S_2$) is from $4.0 \times 10^{-4}$ to $8.0 \times 10^{-4}$, and the preferable ($MB_2$) is not less than $6 \times 10^{-1}$ sec$-1$. The preferred range of $S_1/S_2$ is from 1.30 to 4.1.

For adsorbing compounds in treated water from which compounds having relatively high molecular weights were removed by the previous treatment by ACF(1), it is effective to use ACF(2) having a ratio of pore volume to specific surface area lower than that of ACF(1), that is, having smaller pores than those of ACF(1). If the ratio is outside the range, the adsorptive removing capability for compounds having molecular weights of from 75 to 400 (carcinogenic compounds and bad smelling compounds are almost in this range of molecular weight) is reduced.

Figure 2:
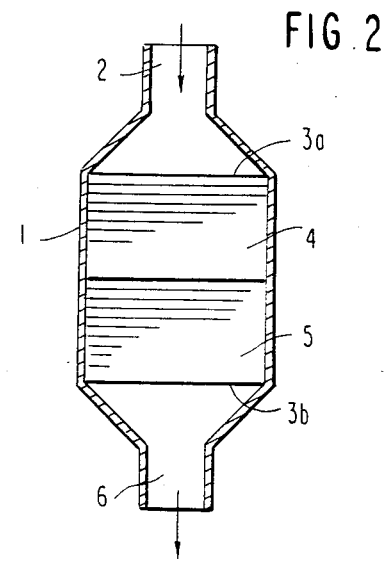
FIG. 2 is a cross-sectional view showing other embodiment of this invention using ACF(1) and ACF(2)

The unit of this invention using two kinds of ACF is explained by referring to FIG. 2, which shows another embodiment of the unit of this invention. The unit is composed of an ACF-containing vessel 1 having an inlet 2 for water to be treated and an outlet 6 for treated water packed therein ACF(1) 4 and ACF(2) 5 held therein by holding plates 3a and 3b. ACF(1) 4 and ACF(2) 5 are disposed successively in the passing direction of water in the order as shown in FIG. 2.

In the foregoing embodiment, the ratio of the packed amount of ACF(1) to the amount of total ACF is preferably in the range of from 10% to 90% by weight. The packing density and other conditions may be same as those in the above-described case using one kind of ACF.

Figure 3:
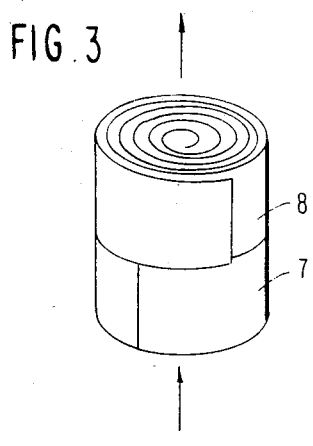
FIG. 3 to FIG. 6 are views showing different packings of the ACF element used for the filter adsorption unit for water purification according to this invention.

FIG. 3 is a view showing an example of a packed form of ACF in the unit, which is composed of ACF(1) 7 and ACF(2) 8 corresponding to ACF(1) 4 and ACF(2) 5 shown in FIG. 2. This example shows an ACF element composed of ACF felt roll wound so that the cross section is an eddy form.

Figure 4:
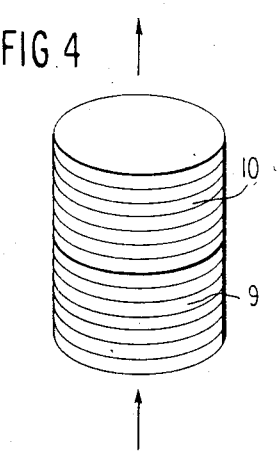

FIG. 4 is another example of an ACF element composed of laminated disc-like ACF(1) felts 9 and ACF(2) felts 10.

Figure 5:
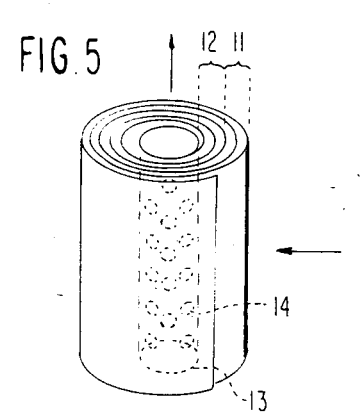

FIG. 5 shows still another example of an ACF element composed of a cylinder 13 having a large number of holes 14, an ACF(2) felt 12 wound around the cylinder, and an ACF(1) felt 11 wound around the felt 12.

Figure 6:
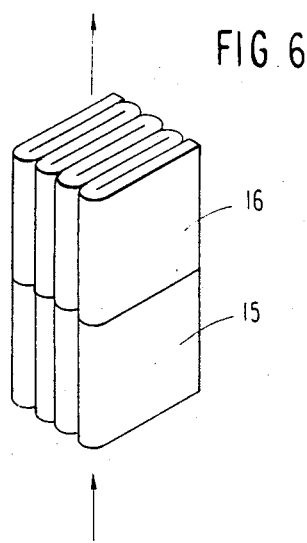

FIG. 6 shows a further example of an ACF element composed of ACF(1) felt 15 bent in zigzag form and ACF(2) felt 16 bent in zigzag form.

Figure 7:
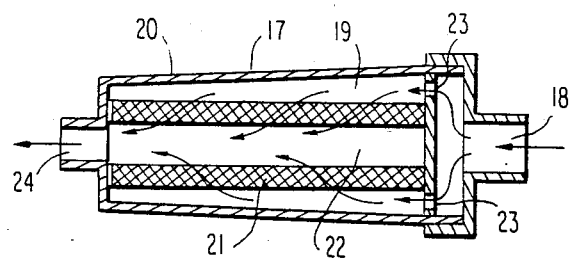
FIG. 7 is a cross sectional view showing an example of the filter adsorption unit especially suitable for mounting the ACF element (cartridge) shown in FIG. 5.

FIG. 7 shows a filter adsorption unit 17 composed of an inlet 18 for a liquid, a space 19 between the wall of the housing 20 and an ACF cartridge 21, an inner space 22 of the cartridge 20, an inlet 23 for introducing liquid into the space 19 of the cartridge 17 and an outlet 24 for flowing out the treated liquid. Into the space 19 active carbon particles may also be packed. Arrows show directions of the liquid which is introduced to the unit for treatment.

A combination of these elements can be used in this invention.

The performance of the unit shown in FIG. 2, which is an example of the filter adsorption unit of this invention is shown in Table 2.

TABLE 2

| No. | First stage SA$_1$ (m²/g) | First stage Vp$_1$/SA$_2$ = S$_1$ | First stage MB$_1$ (sec$^{-1}$) | Latter stage SA$_2$ (m²/g) | Latter stage Vp$_2$/SA$_2$ = S$_2$ | Latter stage MB$_2$ (sec$^{-1}$) | Adsorptive faculty S$_1$/S$_2$ | Adsorptive faculty Removing ratio (%) of Geosmin | Adsorptive faculty Removing ratio (%) of Vitamin B$_{12}$ |
|---|---|---|---|---|---|---|---|---|---|
| 1 | (612) | (4.0 × 10$^{-4}$) | (3.2 × 10$^{-3}$) | 1100 | 5.0 × 10$^{-4}$ | 700 × 10$^{-3}$ | (0.80) | 18 | 94 |
| 2 | 914 | 7.9 × 10$^{-4}$ | 790 × 10$^{-3}$ | 1000 | (3.0 × 10$^{-4}$) | (310 × 10$^{-3}$) | 2.63 | 73 | 94 |
| 3* | 914 | 7.9 × 10$^{-4}$ | 790 × 10$^{-3}$ | 1100 | 5.0 × 10$^{-4}$ | 700 × 10$^{-3}$ | 1.58 | 100 | 100 |
| 4* | 1200 | 6.4 × 10$^{-4}$ | 2300 × 10$^{-3}$ | 1100 | 5.0 × 10$^{-4}$ | 700 × 10$^{-3}$ | 1.28 | 100 | 100 |
| 5 | 1200 | 6.4 × 10$^{-4}$ | 2300 × 10$^{-3}$ | 850 | (4.4 × 10$^{-4}$) | (310 × 10$^{-3}$) | 1.45 | 74 | 100 |
| 6 | 1200 | 6.4 × 10$^{-4}$ | 2300 × 10$^{-3}$ | 1200 | 6.4 × 10$^{-4}$ | 2100 × 10$^{-3}$ | (1.00) | 86 | 100 |
| 7 | 1100 | 4.5 × 10$^{-4}$ | 810 × 10$^{-3}$ | 1100 | 5.0 × 10$^{-4}$ | 700 × 10$^{-3}$ | (0.90) | 58 | 51 |
| 8 | 1100 | 4.4 × 10$^{-4}$ | (53 × 10$^{-3}$) | 1100 | 5.0 × 10$^{-4}$ | 700 × 10$^{-3}$ | (0.88) | 39 | 42 |
| 9 | 1100 | 5.0 × 10$^{-4}$ | 700 × 10$^{-3}$ | 1100 | 5.0 × 10$^{-4}$ | 700 × 10$^{-3}$ | (1.00) | 74 | 74 |
| 10 | 1100** | 10.1 × 10$^{-4}$ | (3.1 × 10$^{-3}$) | 1100 | 5.0 × 10$^{-4}$ | 700 × 10$^{-3}$ | 2.10 | 17 | 17 |
| 11 | 1100** | 10.1 × 10$^{-4}$ | (3.1 × 10$^{-3}$) | 1100** | 10.0 × 10$^{-4}$ | (3.1 × 10$^{-3}$) | (1.00) | 0 | 0 |

*Sample of this invention
Pulverized carbon of 35–65 mesh is packed in an amount of 1.5 g for each stage. In others than (), polyacrylonitrile series ACF is packed in an amount of 1.5 g for each stage.
Values in parentheses are those which are outside of the ranges of the present invention.
In the above Table 2:
Untreated water: Water containing Geosmin (500 as TO value) and 1 ppm of vitamin B$_{12}$. TO was measured by the three flasks comparison type odor measurement method.
SV: 3,000 hr$^{-1}$, column diameter: 25 mm.
Adsorptive property: Removal ratio after passing 250 liters of water.

ACF(1) for use in this invention is obtained by treating ACF having a specific area of higher than 800 m²/g and an ash content of, preferably from 2.5 to 15% by weight and more preferably from 3 to 10% by weight, said ACF being prepared using polyacrylonitrile fibers, using an acid, i.e., a mineral acid or an organic acid for a treatment time of from 5 min. to 180 min. at an acid concentration of from 0.1 to 40% by weight and a treatment temperature of from 5° to 100° C. In the case of using ACF having a small specific surface area, severe conditions are required for obtaining the ACF(1). If the conditions are severer, the amount of removing or desorbing ashes deposited or adsorbed on the pore portions of the ACF becomes larger, whereby the pores of the ACF are enlarged and the pore form and the distribution of the pores are changed.

Although the reason for the effects of ACF(1) for used in this invention have not yet been fully clarified, it is considered that the reason is based on the change of the pore form and the change of the surface functional group (formation of hydrophilic group) caused by the acid treatment.

If the ash content is lower than 2.5% by weight, it is difficult to enlarge the pores of ACF and also if the ash content is higher than 15% by weight, the cores are enlarged too much and the strength of ACF is reduced. The ash content is determined by measuring the ash content after treating the ACF at 680° C. for 24 hours in air.

ACF to be subjected to the foregoing treatments with a mineral acid, etc., is obtained by incorporating polyacrylonitrile series fibers or oxidized fibers obtained therefrom with at least one of salts of, e.g., magnesium, calcium, antimony, tin, aluminum, iron, zinc, silicon, titanium, sulfur, phosphorus, etc., and NH$_4$Cl, NH$_4$Br, and NH$_4$I. The incorporation of the foregoing compound is performed by admixing the compound into an acrylonitrile polymer or by impregnating polyacrylonitrile fibers or the preoxidized fibers with a solution of the compound or spraying the solution of the compound onto polyacrylonitrile fibers or the preoxidized fibers to impregnate the fibers with the solution. The impregnation is ordinary performed in the range of 20° to 90° C. The content of the compound is preferably from 0.1 to 5% by weight (calculated as an element) based on the weight of the fibers. After the incorporation the polymer or the fibers are treated by ordinary method to obtain ACF.

The polyacrylonitrile fibers used to obtain the ACF are obtained from a polymer and/or a copolymer containing at least 60% by weight, preferably from 85 to 98% by weight of acrylonitrile. Examples for the comonomer for the copolymers, include acrylic acid, methacrylic acid, allylsulfonic acid or the salts thereof such as the salts of an alkali metal, e.g., lithium, sodium, potassium, etc., or an alkaline earth metal, e.g., magnesium, calcium, etc., esters, acid chlorides, and acid amides thereof, N-substituted derivatives of vinylamides, vinyl chloride, vinylidene chloride, α-chloroacrylonitrile, vinyl pyridines, vinylbenzenesulfonic acid and vinylsulfonic acid and the salts thereof of an alkaline earth metal such as magnesium, calsium, etc.

Also, fibers obtained from denatured acrylonitrile polymers by hydrolysis, etc., such as an amide-type polymer, etc., or a mixture of an acrylonitrile polymer and an acrylonitrile copolymer or a mixture of two or more of the copolymers can be used.

There is no particular restriction about the size of acrylonitrile fibers but it is preferred that the size is from 0.5 d to 15 d, in particular from 1 d to 5 d. If the size of the fibers is finer than 0.5 d, the strength of the fibers is insufficient and the fibers are liable to be broken. On the other hand, if the fibers are thicker than 15 d, the oxidation rate is slow and also when ACF is formed using the fibers, the strength and elasticity of ACF become low to reduce the activation yield.

The preoxidation treatment for acrylonitrile fibers is performed by heat-treating the fibers in an oxidative atmosphere.

As the medium for the oxidative atmosphere, air, oxygen, hydrogen chloride, sulfurous acid gas, a mixture thereof, or a mixed gas of the foregoing gas and an inert gas is used but air or a mixed gas of air and nitrogen is, optimum from the points of economy and stability of steps.

It is most effective that the oxygen concentration of the oxidative atmosphere in the flame resisting treatment, that is the preoxidation treatment is in the range of 0.2 to 35% by volume. It is preferred that the preoxidation treatment is performed in two steps, i.e., in a medium of the oxygen content of 20 to 30% by volume in the former step and in a medium of the oxygen content of 0.5 to 9% by volume in the latter step. The oxidation treatment is performed under such a tension that the shrinkage percentage of the fibers in each step of the oxidation becomes, preferably, from 50 to 90%, more preferably from 60 to 80%, of the free shrinkage percentage.

The time required for the oxidation treatment is usually from 0.5 to 30 hours, preferably from 1.0 to 10 hours and the oxidation treatment is performed until the bonded amount of oxygen becomes higher than 15% by weight. If the bonded amount of oxygen is lower than the foregoing value, the flame resistance obtained is low, cutting of the tow occurs in the case of a high-temperature activation, and the activation yield is also reduced.

The amount of oxygen bonded is preferably higher than 16.5% by weight and can be increased to almost about from 23 to 25% by weight. The expression "amount of bonded oxygen" as used in this disclosure represents a magnitude to be determined by the following formula.

$$\text{Amount of bonded oxygen (\% by weight)} = \frac{\left(\begin{array}{c}\text{Total weight}\\\text{of sample}\end{array}\right) - \left(\begin{array}{c}\text{Weight}\\\text{of ash}\end{array}\right) - \left(\begin{array}{c}\text{Total weight}\\\text{of C.H.N}\end{array}\right)}{\left(\begin{array}{c}\text{Total weight}\\\text{of sample}\end{array}\right) - \left(\begin{array}{c}\text{Weight}\\\text{of ash}\end{array}\right)} \times 100$$

The oxidation temperature is generally from 200° to 400° C. and the optimum temperature depends upon the kind of the oxidation medium and the presence or absence of phosphorus but it is from 225° to 250° C.

The activation of the fibers can be performed by a batch system or a continuous system, but a continuous system of continuously supplying the oxidized fibers into an activation furnace and activating is desirable. In this case, as the temperature is increased, the activation proceeds more quickly, whereby air is carried by the introduction of the oxidized fibers in the activation furnace, eventually causing uneven activation. For avoiding the occurrence of such a problem, it is preferred to maintain the pressure in the furnace within the range of from 0.002 to 2 kg/cm² (gauge pressure, and so forth) by the adjustment of the opening extent of the slit for introducing the oxidized fibers or the introduction of nitrogen gas or steam in the activation furnace. If the pressure in the furnace is lower than 0.002 kg/cm² or a negative pressure, the formation of uneven activation becomes severe and fibers are burnt down to ashes whereby the production of good product becomes impossible. On the other hand, if the pressure in the furnace becomes extremely high, steam condenses from the slit portion, etc., to low-temperature portions to clog the slit portion, whereby uneven activation is also liable to occur.

As the activation gas, steam, carbon dioxide, etc., can be used, but it is preferred to use a mixed gas of steam as a main gas component and carbon dioxide and/or nitrogen. It is also preferred to use an activation gas containing steam of higher than 30% by volume of the total volume thereof. As a gas which can be mixed with steam for making the activation gas, nitrogen, helium, argon, ammonia, carbon dioxide, nitrogen dioxide, etc., are used singly or as a mixture thereof.

The activation temperature is from 800° to 1,400° C., and preferably from 900° to 1,100° C., and the activation time depends upon the activation temperature, but is preferably 1 minute to 120 minutes.

As an acid for the acid treatment, an acid having a size capable of permeating into the pore portions of the ACF is preferably used. An acid having a molecular weight of lower than about 300 and capable of being removed in the case of remaining is better and an acid having a boiling point or a decomposition point of lower than 150° C. is preferably used. Examples of the acid are mineral acids such as hydrochloric acid, nitric acid, sulfuric acid, phosphoric acid, etc., and organic acids such as oxalic acid, malonic acid, succinic acid, formic acid, acetic acid, propionic acid, etc. In particular, hydrochloric acid and nitric acid are preferred.

The acid treatment is usually performed by immersing ACF in an aqueous solution of the acid. It is preferably that the concentration of the acid is from 0.1 to 40% by weight. If the concentration is lower than 0.1% by weight, it is difficult to improve the adsorptive property but if the concentration is higher than 40% by weight, the strength of the fibers is greatly deteriorated. The acid concentration is more preferably in the range of from 0.5 to 10% by weight. It is proper than the proportion of ACF in an aqueous acid solution is about from 0.5 to 50% by weight.

The acid treatment is performed at a treatment temperature of from about 5° to 100° C. and in particular, a treatment temperature of higher than 50° C. is preferred since the acid treatment can be finished in a short period of time. If the treatment time is too short, ACF having desired characteristics is not obtained, while if the treatment time is too long, the specific surface area and the strength of filaments are reduced. The remaining acid after the acid treatment is removed by washing ACF thus treated with water of 25° to 90° C. in an amount of at least 5 times that of the weight of ACF. It is difficult to obtain such ACF by using phenolic fiber or rayon.

ACF(2) which is used for the latter step of the filter adsorption unit in the passing direction of water to be treated is produced by the same manner as the case of producing ACF(1) which is used for the former step of the unit or a conventional method. In the case of producing ACF(2) in the same manner as the case of producing ACF(1), the acid treatment may be performed at a milder condition than the case of producing ACF(1).

Furthermore, by applying a silver compound onto the ACF (including the case of using ACF(1) and ACF(2)) for use in this invention in an amount of 50 to 17,000 ppm (as silver) to the weight of ACF, a filter adsorption unit for water purification having an excellent sterilizing effect can be obtained.

Application of a Ag compound onto the ACF can be conducted by the following method.

The application of a Ag compound is conducted after production of ACF(1) or ACF(2). ACF are impregnated with a solution of a silver compound such as an aqueous solution of AgOH or inorganic salts of silver such as $Ag_2SO_4$, $AgNO_3$, $Ag_2CO_3$, etc. The concentration of the solution is preferably from 0.005 to 5% by weight, temperature of the solution is preferably from 5° to 95° C., and usually the fiber is treated with the solution for from 5 seconds to 30 minutes. At any state of the treatment the pH of the solution may be adjusted to from 8 to 10.0 by adding a solution of an alkali compound such as NaOH or KOH or an aqueous ammonia during the treatment. Since during the treatment with the solution the pH is gradually reduced, the pH may also be adjusted during the treatment. The ACF is preferably treated with a solution containing a Ag compound under an alkaline condition as described above or treated in an alkaline aqueous solution bath after the treatment in a solution containing a Ag compound. Examples of alkaline compound used in the bath include NaOH, KOH or $NH_3$. The pH of the alkaline solution is preferably from 8.0 to 10.0 and the alkali treatment in the bath is usually conducted at from 5° to 95° C. for from 5 to 60 minutes.

The treatment under such an alkaline condition it is effective to fix Ag as a stable substance such as metal Ag, $Ag_2O$ or a mixture thereof.

After the above-described treatment or treatments the ACF is dried. Drying is usually conducted at from 60° to 120° C. for from 5 to 120 minutes. After drying the ACF is preferably subjected to an inert gas stream such as a $N_2$, He, Ar gas and mixture thereof to remove an acid anion in the ACF. The treatment with an inert gas is conducted preferably at from 120° to 500° C. for from 5 to 120 minutes. Although the state of Ag in or on the ACF is not confirmed, it is considered that the silver compound used for treatment changes and exists as metal silver, $Ag_2O$, or a mixture thereof.

Also, the ACF element of this invention may be used in the form of a combination with granular carbon. In this case, it is advantageous that they are so disposed that water to be treated is first passed through granular carbon.

Examples of this invention are further illustrated below, together with comparison examples.

EXAMPLE 1

A dull type (containing 0.1% by weight of $TiO_2$) tow (size of a filament was 1.5 d) of 540,000 deniers having a copolymer composition of 91.5% (by weight) acrylonitrile, 8.0% methyl methacrylate, and 0.5% acrylamide was continuously immersed in an aqueous solution of 0.07% by weight aluminum sulfate at 25° C. for about 10 minutes, whereby the solution was contained in the tow in an amount of 0.15% by weight as Al. Thereafter, when the tow was subjected to an oxidation treatment in air for 2 hours at 240° C. and further for 0.5 hours at 270° C. under a tension so that the shrinking percentage became 75 to 80% of the free shrinking percentage, preoxidized fibers having an amount of bonded oxygen of 18.5% by weight was obtained. Furthermore, the treated fibers were immersed in an aqueous solution of 0.50% by weight ammonium secondary phosphate for about 10 minutes at 25° C., whereby the solution was contained in the fibers in an amount of 0.45% by weight as phosphorus. Furthermore, when the fibers thus treated were continuously activated in an activation furnace for 2.0 minutes by an activation gas (volume ratio: $H_2O/N_2=2/1$) at an activation temperature of 1050° C. and an inside pressure of 0.005 kg/cm$^2$, ACF having a specific surface area (SA) of 1250 m$^2$/g, a pore volume (Vp) of 0.54 cc/g, (Vp)/(SA) of $4.3 \times 10^{-4}$, a methylene blue adsorption rate constant of $1.2 \times 10^{-1}$ sec$^{-1}$, a tensile strength of 47.4 kg/cm$^2$, a benzene adsorbing amount of 48% by weight was obtained. The amount of the ash was 4.7 wt%.

The thus obtained ACF was treated with an aqueous solution of 1.5% by weight hydrochloric acid at an ACF to aqueous solution ratio of 1/100 by weight ratio for 60 minutes at 60° C., and then the treated ACF was washed with water of 80° C. for 30 minutes. The amount of water was 200 times the wieght of the ACF. ACF having a specific surface area (SA) of 1050 m$^2$/g, a pore volume (Vp) of 1.51 cc/g, (Vp)/(SA) of $14.4 \times 10^{-4}$, a methylene blue adsorption rate constant of 2.7 sec$^{-1}$ and an ash content of 4.7% by weight was obtained.

5 g of the thus-obtained ACF was packed in a column of 3 cm in diameter at a layer height of 7 cm and 250 liters of an aqueous solution of Geosmin having TO (threshold odor) of 500 at SV of 50 hr$^{-1}$, the removing ratio of TO of the treated solution was 100%.

When 2,000 ml of an aqueous solution containing 100 ppm of vitamin $B_{12}$ was passed by the same way as above at SV of 50 hr$^{-1}$, the removing ratio of vitamin $B_{12}$ was 100%.

COMPARISON EXAMPLE 1

By following the same procedure as Example 1 without performing the hydrochloric acid treatment, ACF was prepared. The characteristic values of the ACF were same as those of the ACF in Example 1 before the hydrochloric acid treatment. 5 g of the ACF was packed in the same column as in Example 1, an aqueous solution of Geosmin or vitamin $B_{12}$ was passed through the column under the same conditions as in Example 1, and the removing ratios of TO and vitamin $B_{12}$ were measured, the removing ratios were 21% and 0%, respectively.

COMPARISON EXAMPLE 2

The preoxidized fibers as used in Example 1 were treated with an activation gas (volume ratio: $H_2O/N_2=2/1$) for one minute at an activation temperature of 1050° C. and an inxide pressure of 0.005 kg/cm$^2$ in an activation furnace, ACF having a specific surface area of 670 m$^2$/g and a pore volume of 0.24 cc/g was obtained. By treating the ACF with an aqueous solution of 6% by weight calcium citrate at 25° C. to adsorb thereon 3% by weight as Ca and then activating with an activation gas (volume ratio: $H_2O/N_2=2/1$) for 30 seconds at 1050° C., ACF having a specific surface area of 950 m$^2$/g, a pore volume (Vp) of 1.04 cc/g, (Vp)/(SA) of $10.9 \times 10^{-4}$, a methylene blue adsorption rate constant of $3.8 \times 10^{-1}$ sec$^{-1}$ and an ash content of 7.5% by weight was obtained.

The same tests as in Example 1 were performed using the thus-obtained ACF, the removing ratio of Geosmin was 27% and the removing ratio of vitamin $B_{12}$ was 74%.

EXAMPLE 2

(1) By following the same procedure as Example 1, a felt of ACF(2) having a specific surface area (SA) of 1250 m$^2$/g, a pore volume (Vp) of 0.54 cc/g, (Vp)/(SA) of $4.3 \times 10^{-4}$, a methylene blue adsorption rate constant of $1.2 \times 10^{-1}$ sec$^{-1}$, and an ash content of 5.1% by weight was obtained. The ACF(2) felt was treated with an aqueous solution of 2.0% by weight hydrochloric acid at an ACF(2) to aqueous solution ratio of 1/100 by weight for 60 minutes at 80° C., and then washed with water in the same manner as in Example 1. A felt of ACF(1) having a specific surface area (SA) of 1100 m$^2$/g, a pore volume (Vp) of 1.55 cc/g, (Vp)/(SA) of $14.1 \times 10^{-4}$, a methylene blue adsorption rate constant of 2.9 sec$^{-1}$ and an ash content of 2.1% by weight was obtained.

Then, 1.5 g of the ACF(1) felt thus obtained was rolled so that the cross section became an eddy form and packed in a polyvinyl chloride cylinder of 25 mm in diameter at a layer height of 3 cm as the first stage in the water passing direction as shown in FIG. 3, and also 1.5 g of the ACF(2) felt was packed in the cylinder in the same manner as above at a height of 3 cm as the latter stage in the passing direction of water. When 250 liters of water containing Geosmin (500 TO value) and 1 ppm of vitamin $B_{12}$ was passed through the cylinder at SV of 3,000 $hr^{-1}$, the removal ratios of Geosmin and vitamin $B_{12}$ were 100%.

(2) When the ACF(2) felt was packed in the cylinder as above as the first state in the passing direction of water and the ACF(1) felt was packed as the latter stage and the water containing the same components as above was passed through the cylinder under the same conditions as above, the removal ratio of vitamin $B_{12}$ was 100%, but the removal ratio of Geosmin was 65%.

COMPARISON EXAMPLE 3

Polynosic fibers each filament had a diameter of 3 denier were immersed in an aqueous solution of 10% phosphoric acid to adsorb 10% by weight of phosphoric acid as phosphorus and dried at 110° C. for 30 minutes. The thus treated fibers were preoxidized in air for 30 minutes at 260° C. and then activated by steam for 25 minutes at 870° C. to obtain ACF(a) having a specific surface area of 1470 $m^2/g$, a pore volume of 0.55 cc/g, a ratio of pore volume to specific surface area of $3.74 \times 10^{-4}$, a methylene blue adsorption rate constant of $100 \times 10^{-3} sec^{-1}$, a benzene adsorbing amount of 47%, a filament tensile strength of 27 $kg/mm^2$, and an ash content of 12.5 wt% was obtained. The thus obtained ACF(a) was treated with an aqueous solution of 1.5% by weight hydrochloric acid at an ACF to aqueous solution ratio of 1/100 by weith ratio for 60 minutes at 50° C. and then washed with water at 20° C. for 30 minutes to obtain ACF(b) having a specific surface area of 1510 $m^2/g$, a pore volume of 0.73, a pore volume to specific surface area ratio of $4.83 \times 10^{-4}$, a filament tensile strength of 11 $kg/mm^2$ and an ash content of 4.9 wt% was obtained.

When the same test as in Example 1 using ACF(a) and ACF(b) instead of ACF(2) and ACF(1), respectively, was conducted the removing ratio of Geosmin was 20%.

EXAMPLE 3

The ACF of this invention obtained in Example 1 was fabricated into a sheet form (120 $g/m^2$) by means of a needle punch. The ACF sheet (3 g) was immersed in 1 liter of an aqueous solution of 0.02% by weight silver sulfate ($Ag_2SO_4$), the pH was adjusted to 8 by sodium hydroxide, and for 30 minutes at 25° C., while adjusting the pH, when the pH became lower, to 8 with sodium hydroxide, washed with 3 liters of pure water at 25° C., and dried at 110° C. for 60 minutes to provide ACF containing 2,500 ppm of silver.

The ACF sheet placed on a polyester nonwoven fabric (10 $g/m^2$) and the assembly was wound round on a cylinder made of polypropylene (having a net-work structure wall with pores each having a size of $5 \times 5$ mm, and having an inner diameter of 20 mm) in the manner that the nonwoven fabric is directly attached to the cylinder to form a concentric-cylindrical cartridge (as shown in FIG. 5) having an outer diameter of 44 mm, an inner diameter of 20 mm and a length of 125 mm.

The cartridge was placed in a housing as shown in FIG. 7. The housing had an inner diameter at inlet side of 52 mm, an inner diameter of 48 mm at outlet side, and had the same inner length as the cartridge.

On the other hand, the ACF obtained in Example 1 was treated in an aqueous solution of 0.04% by weight silver sulfate (any alkaline compound was not added to adjust the pH) to adsorb thereon 2,500 ppm of silver to provide a silver-containing ACF sheet (120 $g/m^2$) in the same manner as described above and the sheet was packed in the cylinder also as described above to form a cartridge and the cartridge was mounted in a housing as above to provide a filter unit (2).

River water containing $4 \times 10^4$ of coliform bacilli per milliliter of water and having BOD (Biochemical Oxygen Demand) of 10 ppm was passed through the cartridge of each filter unit at 2 liters/min. When the cartridge of filter unit (1) was used the number of coliform bacilli in the treated water after passing 10 liters of water was 0 per milliliter and the BOD was 0 ppm, and the number of coliform bacilli in the treated water after passing 1200 liters of water was 0 per milliliter and the BOD was 1 ppm in the cartridge of filter unit (1), while when the cartridge of filter unit (2) was used the number of coliform bacilli in the treated water after passing 10 liters of water was 0 per milliliter and the BOD was 0 ppm, and the coliform bacilli after passing 1200 liters of water was $3 \times 10^2$ per milliliter and the BOD was 1 ppm.

From the above described results it can be seen that by treating Ag containing-ACF with an alkaline solution superior ACF to that which is not treated with an alkaline is obtained.

While the invention has been described in detail and with reference to specific embodiments thereof, it will be apparent to one skilled in the art that various changes and modifictions can be made therein without departing from the spirit and scope thereof.

What is claimed is:

1. Active carbon fibers derived from acrylic fibers and having a BET specific surface area (SA) of from 800 to 2,000 $m^2/g$, a ratio of pore volume (Vp) to (SA) of from $5 \times 10^{-4}$ to $14.5 \times 10^{-4}$, and a methylene blue adsorption rate constant of not less than $5 \times 10^{-1} sec^{-1}$.

2. Active carbon fibers as claimed in claim 1, wherein the length of the fibers is longer than 2 mm.

3. Active carbon fibers as claimed in claim 1, wherein said acrylic fiber comprising a polymer containing at least 60% by weight of acrylonitrile.

4. Active carbon fibers as claimed in claim 1, wherein said active carbon fibers are obtained by preoxidizing acrylic fibers, activating the thus obtained preoxidized fibers and subjecting the thus obtained active carbon fibers to an acid treatment.

5. Active carbon fibers as claimed in claim 4, wherein the ash content of the activative carbon fibers is from 2.5 to 15% by weight.

6. Active fibers as claimed in claim 4, wherein the acid used in said acid treatment is selected from the group consisting of hydrochloric acid, nitric acid, sulfuric acid, phosphoric acid, oxalic acid, malonic acid, succinic acid, formic acid, acetic acid and propionic acid.

7. Active carbon fibers as claimed in claim 4, wherein said acid treatment is conducted by immersing the active carbon fibers in an aqueous solution of an acid.

8. Active carbon fibers as claimed in claim 6, wherein said aqueous solution has a concentration of an acid of from 0.1 to 40% by weight.

9. Active carbon fibers as claimed in claim 4, wehrein said acid treatment is conducted at from 5° to 100° C.

10. Active carbon fibers as claimed in claim 4, wherein said acid treatment is conducted for from 5 to 180 minutes.

11. Active carbon fibers as claimed in claim 1, wherein said active carbon fibers have silver in an amount of from 50 to 17,000 ppm based on the weight of active carbon fibers.

* * * * *